Dec. 29, 1964  J. A. PERRIN  3,163,796
ELECTRODE SYSTEMS FOR ELECTRIC ARCS
Filed March 2, 1960  2 Sheets-Sheet 2
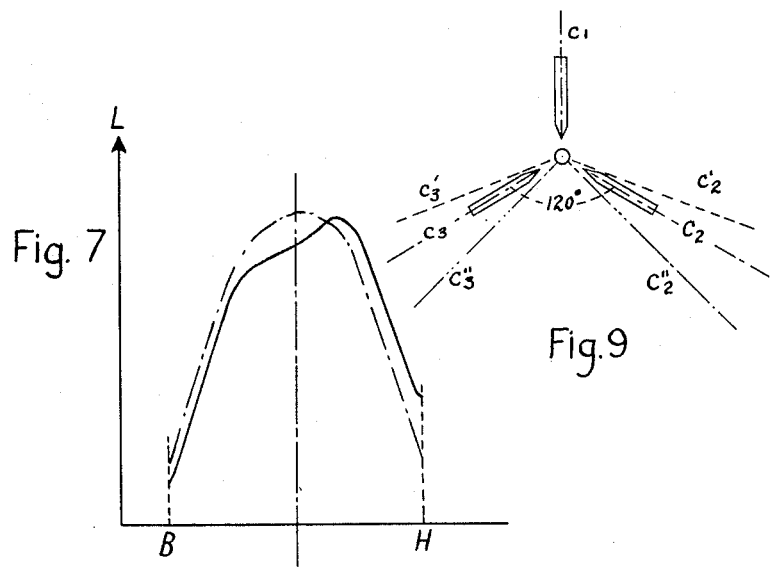
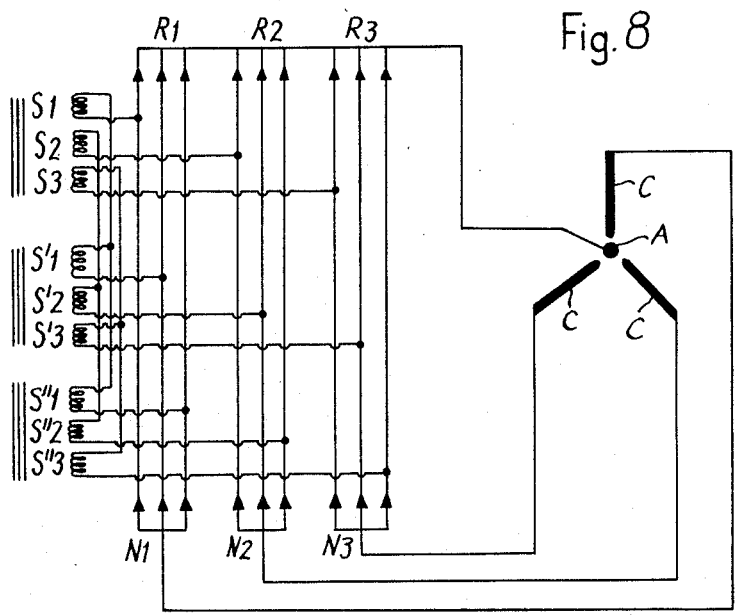
Inventor
Jean Adrien Perrin
By
Stone & Mack,
Attorneys

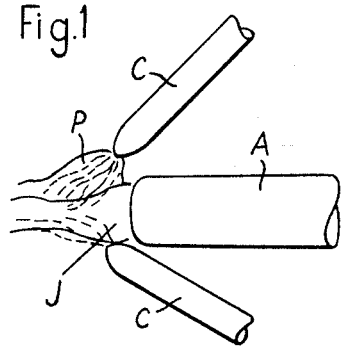
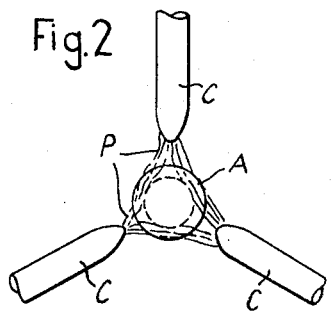
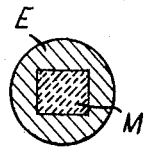
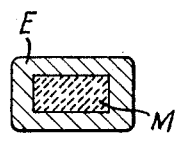
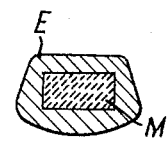
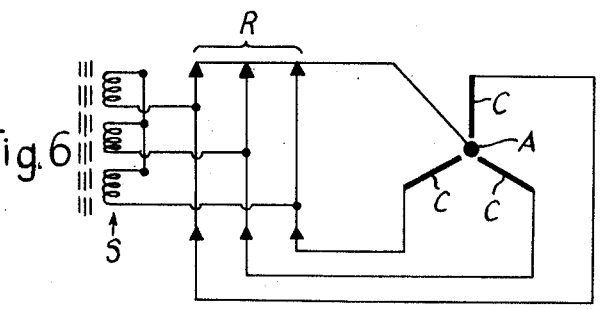

3,163,796
ELECTRODE SYSTEMS FOR ELECTRIC ARCS

Jean Adrien Perrin, Pagny-sur-Moselle, Meurthe-et-Moselle, France, assignor to Societe le Carbone-Lorraine, Paris, France, a French company
Filed Mar. 2, 1960, Ser. No. 12,322
Claims priority, application France Mar. 3, 1959
2 Claims. (Cl. 314—45)

The present invention relates to electrode systems for electric arcs and has for an object improvements therein.

Carbons for arc lamps operating on direct current are generally arranged in two ways: in the first case the axes of the anode and of the cathode are co-linear, for example in simplified high intensity lamps employed for cinematographic projection; in the second case the axes of the carbons form an angle. Thus the anode is in a horizontal position whereas the cathode is located in the same plane below the horizontal axis at an angle of 125 to 180°, or of 90 to 180°, according to the purposes for which the lamp is required.

Anodes for intensive arcs generally consist of a cylindrical crust of carburized matter fired at high temperature and which may, if desired, be coppered on the outside. They may have a cylindrical interior bore or channel, the surface of which may be smooth or grooved. This bore or channel is filled with a core paste consisting of fixed proportions of carburized matter and mineral salts.

When the arc is made to strike between the anode and the cathode, vulcanization of the mineral salts contained in the core paste is produced at the extremity of the anode which is raised to a high temperature. The extremity of the anode becomes more or less deeply hollowed to form a crater from which emerge luminescent vapours.

In arcs with co-axial carbons the cathodic plasma tends to repel the vapours emanating from the anodic crater, the more vigorously as the intensity increases. This phenomenon causes the spreading of the luminous vapours outside the rim of the crater, which entails a loss of luminous energy. In order to concentrate the luminescent vapours so that they do not spill over the rim of the anodic crater, an air blowing device co-axial with the anode has already been proposed. This device however cools the extremity of the anode and thus causes a loss of energy. Simultaneously the crust of the anode is strongly oxidised by the co-axial jet of air, which involves an increase in speed of combustion of the anode.

It is moreover observed that in the case of the normal arrangement with co-axial carbons, the cathodic plasma undergoes a characteristic modification when the intensity reaches or exceeds 80 amperes. A dart or tongue appears in the centre of the cathodic plasma and from then onwards the cathodic plasma acquires such an energy that it succeeds in pumping or blowing out the luminescent vapours, so that the luminous efficiency becomes poor. The use of cathodes with a double core makes possible sound functioning under conditions in the vicinity of or higher than 80 amperes without appearance of the cathodic dart. However, the employment of such cathodes entails a decrease in the luminous energy collected by the optical system, as the section of the extremity of these cathodes is greater than that of cylindrical cathodes.

Another disadvantage arising from the use of co-axial carbons relates to the metallic vapours emanating from the anode. They may form at the extremity of the cathode a deposit of metallic carbide which is the heavier as the carbons are closer together. This deposit renders the cathodic function unstable. It may even explode. The formation of the deposit can be avoided, but at the expense of energy.

In arc lamps having co-axial carbons, as employed in cinematographic projection, an aperture is made in the central portion of the mirror, generally 70 mm. in diameter, so as to leave sufficient space for the feed and guide mechanism of the cathode. This aperture corresponds in part to the region of oculation by the cathode of the anode crater. This device also involves a loss of luminous energy.

Inclined-cathode arcs employed for intensities in the neighbourhood of or above 100 amperes exhibit a pronounced dart or tongue at the extremity of the cathode. The great kinetic energy of the cathodic plasma is such as to bring about a deformation of the jet of luminescent vapours. When the distribution of luminosity over the surface of the crater is analysed, it is found that along the axis of the crater defined by its intersection with the plane formed by the axes of the anode and the cathode, the variation in luminosity is not symmetrical with reference to the axis of the anode, and that it exhibits a maximum between the centre and the rim of the crater on the opposite side to the cathode. This deformation of the jet of luminous vapours entails a comparatively low luminous efficiency. Certain devices have been made to concentrate the luminescent vapours in front of the crater, particularly by means of a jet of air concentric with the anode. This blowing process however presents the same drawbacks as those previously described.

One object of the present invention is to remedy the disadvantages described above, whilst making possible rational use of the jet of luminescent vapours, an increase in luminous flux and in luminous efficiency, and a reduction in consumption of electrical power.

Another object of the invention is to utilize the energy of the cathodic plasma to collect the luminescent vapours emanating from the anode crater, in front of the latter, within a volume concentric with the axis of the anode.

Accordingly the invention consists in an electrode system for electric arcs in which one or more cathodes are arranged above the anode.

The arrangement of electrodes may comprise a central anode and a plurality of cathodes whose tips are arranged around a circle concentric with the crater formed in the anode during operation, and the said tips may be arranged in the plane of the said crater.

The invention also provides a system as referred to above, in which the electrodes are fed with current from a direct current generator that has a single positive outlet and a number of negative outlets equal to the number of cathodes. Alternatively, the electrodes may be fed from an alternating-current generator to the outlet of which is connected a rectifier, which may be in bridge form.

Other features and advantages of the invention will be apparent from the specific description which is to follow.

With the arrangement according to the invention, when the front surface of the anode is observed, the crater appears completely distinct, as the points of the cathode are arranged upon a circle concentric with the anode crater. The cathodes may further be arranged behind, slightly in front or in the same plane as the anodic crater.

In order that the invention may be more clearly understood, reference will now be made to the accompanying drawings which show some embodiments thereof by way of example and in which:

FIGURE 1 shows diagrammatically a side view of a first embodiment of electrode arrangement, FIGURE 2 shows diagrammatically a view of the arrangement of FIGURE 1, looking towards the anode crater, FIGURES 3, 4 and 5 respectively show cross-sections through various forms of anode, FIGURE 6 shows diagrammatically a circuit diagram of an appropriate electricity supply arrangement for a three-cathode system, FIGURE 7 is a diagram explaining the electrical operation of the invention, FIGURE 8 shows diagrammatically a circuit diagram of another embodiment of electricity supply arrangement, FIGURE 9 shows a side view, partly in section, of a practical embodiment of a 3-cathode system.

Referring to the drawings, FIGURES 1 and 2 represent one electrode arrangement of the invention, comprising three cathodes arranged along the ridges of a trihedron, the axis of which coincides with that of the anode, and in which A designates the anode, C the cathode, P the cathodic plasma, and J the jet of luminescent vapours emanating from the anodic crater.

The distribution of the cathodes around the anode may be regular or irregular, symmetrical or non-symmetrical. The inclination of the axes of the cathodes with reference to the axis of the anode is thus not restricted to that illustrated in FIGURES 1 and 2. It may vary according to the conditions adopted, and as may be convenient to the embodiment, between 0 and 120°. Thus the angle formed by the axes of two adjacent cathodes may differ from that formed by two other cathodes. This will be referred to later in connection with FIGURE 9.

The anode may have a circular section, whatever embodiment of the invention be used. It may also have a section of any form intended to adapt the dimensions of the luminous source to those of the target which the pencil of light is required to reach, taking into account the optical device employed. For example, in the case of cinematographic projection, the anode may have a rectangular, elliptical or any other kind of section. The form of the section of the core may be similar to that of the anode, but it may equally assume a different form. FIGURES 3, 4 and 5 represent by way of non-limiting example anode sections which may be employed according to the invention. The crust is designated E and the core M.

The system of the invention also includes means for supplying electrical power to the arrangements described above.

It is possible to use a conventional generator or rectifier, but to permit of good distribution of the current among a plurality of cathodes, it is necessary to introduce into the circuit between the negative outlet of the source of supply and each of the cathodes, a balancer resistance, which absorbs an appreciable portion of the power. The invention thus has for another object the reduction of the considerable loss of luminous efficiency when using conventional generators, by a particular system of supply.

The supply lay-out according to this aspect of the invention comprises a direct current generator having a single positive outlet and a number of negative outlets equal to the number of cathodes.

The generator may be made up by a rotary set comprising an asynchronous motor and a dynamo having a number of poles not fewer than twice the number of cathodes employed. The positive brushes are interconnected, to provide a single outlet terminating at the anode; the negative brushes are connected individually to each of the cathodes. In this way, a generator having six poles can serve to supply an arc equipped with three cathodes, with pulsating direct current.

The generator may also consist of a polyphase transformer followed by a rectifier, the latter fitted with a single positive outlet and with a number of negative outlets equal to the number of cathodes. This system will be better understood by the diagram shown in FIGURE 6. In this case the supply is effected by a static three-phase rectifier. The electrode arrangement comprises a central anode and three cathodes e.g. as shown in FIGURES 1 and 2. The three-phase secondary windings are represented in FIGURE 8 by S, and the rectifier element by R, and the latter is modified to include one positive outlet and three negative outlets. In this example the rectified current flowing in each of the cathodes has a duration in the region of $\frac{1}{75}$ of a second for each cycle of alternating feed current at frequency 50 cycles per second. The current is thus pulsating.

By modifying the lay-out devices of the rectifier elements, the duration of the impulse passing in each cathode for each cycle may be increased or decreased. When the duration of each impulse is in the neighbourhood of and slightly below $\frac{1}{100}$ of a second, the use of a single rectifier would make possible a cooling of the extremity of the cathode to such an extent that the restriking voltage at the beginning of each impulse per cathode would be too high. On the other hand, when the duration of each impulse is in the neighbourhood of and slightly below $\frac{1}{50}$ of a second, the restriking voltage at the beginning of each impulse and per cathode is reduced in consequence of a lesser cooling of the extremity of the cathode, if bridge rectifiers are employed between each phase of the outlets of the supply transformer.

In devices for supply by three-phase transformers and rectifiers, the current impulses rotate successively from one cathode to the next. This succession of impulses and restrikings of the arc among the cathodes causes a slight noise which may be troublesome in the case of certain applications.

With a view to avoiding the noise and improving the efficiency, there is provided an arrangement illustrated in FIGURE 8. The supply is effected by means of a three-phase transformer, or by means of three single-phase transformers, the secondaries of which each comprise three windings, S1, S2, S3: S'1, S'2, S'3: S''1, S''2, S''3. The outlets of S1, S'1, S''1 are connected to the three-phase rectifier element R1; S2, S'2 and S''2 to the element R2, and S3, S'3, S''3 to the element R3. The positive outlets are interconnected and connected to the anode A, the independent negative outlets, N1, N2, N3, are each connected to the cathodes C.

A further electrode arrangement comprising three cathodes is diagrammatically represented in FIGURE 9. The planes formed by the axes of each of the cathodes c1, c2, c3 and the axis of the central anode a are mutually inclined at 120°, the axis of the upper cathode c1 being in the vertical plane passing through the axes of the central anode a. In this arrangement, which is intended for cinematographic projection, the angle formed by the planes containing the axes of each of the lower cathodes c2 and c3 and the axis of the anode a can have a value greater than 120° and the two cathodes are then disposed along the dotted lines c'2, c'3. According to a modification the angle previously defined can be less than 120° and the cathodes then occupy positions represented by the chain-dotted lines c''2 and c''3.

The improvement of the luminous efficiency of an arc equipped with the improvements according to the invention is thus obtained by a natural concentration of the jet of luminescent vapours in front of the crater, and by using the force of the cathodic plasma emanating from each cathode. FIGURE 7 shows, by way of a non-limiting example, the distribution of the luminosity along the vertical axis, of a single carbon anode employed at the same intensity, and two arrangements of negatives. The solid line curve represents the use of a negative arranged in the customary manner. The dotted line curve represents the use of several negatives arranged according to the invention.

The table below provides a comparison of luminous flux efficiency between an arc with co-axial carbons for cinematographic projection, and an arc source of light employing the arrangement according to the invention, supplied by a three-phase bridge rectifier, according to one of the methods of supply of the invention. The measurements were performed employing the same type of carbon anode, of circular section. The same intensity was also employed for both types of arc, in this case 60 amperes.

It should also be mentioned that the luminous fluxes were received by the cinematographic screen under the following conditions: standard sound film gate, objective f/1.9, without shutter or filters.

|  | Luminous flux (lumens) | Electric power used (W) | Efficiency, lumens/ watts |
|---|---|---|---|
| Arc with co-axial electrodes | 12,080 | 1,960 | 6.16 |
| Arc according to the invention | 13,730 | 1,740 | 7.89 |

An increase of about 28% in luminous efficiency is observed.

The present invention applies both to sources of light employed in cinematographic projection and to sources of light intended for cine-photography, for military searchlights, for town lighting, for the lighting of large areas or monuments. These sources of light also find applications in photogravure studios.

The arc arrangements according to the invention employed with an optical device of short focal length, may further be equipped with a suction nozzle for hot vapours: this may be arranged at the centre of the optical device, without the volume of air exhausted by the nozzle modifying appreciably the convection air currents in the neighbourhood of the arc. Whilst maintaining thermal equilibrium, the suction nozzle also makes it possible to evacuate a considerable portion of the calorifix flux emanating from the arc. Anti-calorific filters then assume less importance and may even be omitted.

It should also be pointed out that the different known methods of supply by pulsating currents and also the type of supply providing current impulses the frequency of which is a multiple of the frequency of projection of the cinematographic images apply to the various arrangements of cathodes described in the present invention. The particular arrangement of cathodes enables the anodic luminescent effect to be utilized to the best advantage when the intensity reaches or exceeds 80 amperes at the impulse maximum. The effect of the energy of the cathodic plasma may further be modified by known magnetic processes such as permanent magnet, solenoid etc.

Finally the present invention is applicable to all kinds of carbon anodes, whatever may be the composition of the core paste.

I claim:

1. An electric arc lamp system comprising a central anode, three cathodes mounted about said anode in equally radially spaced relationship and with the tips of said cathodes co-planar with the crater formed in the tip of said anode during operation, and means for feeding pulsed direct current to said cathodes in succession.

2. An electric arc lamp system comprising a central anode, three cathodes mounted about said anode in equally radially spaced relationship, the longitudinal axes of said cathodes sloping towards and meeting the longitudinal axis of said anode and with the tips of said cathodes co-planar with the crater formed in the tip of said anode during operation, and means for feeding pulsed direct current to said cathodes in succession.

References Cited in the file of this patent

UNITED STATES PATENTS

| 1,113,778 | Gray | Oct. 13, 1914 |
| 1,479,370 | Coffin et al. | Jan. 1, 1924 |
| 1,552,349 | Ryan | Sept. 1, 1925 |